Jan. 4, 1938.     F. KENNISON     2,104,043

SAFETY DEVICE

Filed Oct. 30, 1936

INVENTOR
Frank Kennison
By his Attorney
Harlow M. Davis

Patented Jan. 4, 1938

2,104,043

UNITED STATES PATENT OFFICE 2,104,043

SAFETY DEVICE

Frank Kennison, Beverly, Mass., assignor to United Shoe Machinery Corporation, Paterson, N. J., a corporation of New Jersey Application October 30, 1936, Serial No. 108,383

7 Claims. (Cl. 12—14)

This invention relates to safety devices and particularly to devices for preventing operation of clutch-controlled motor-driven machines after the motor current is cut off.

Various shoe machines, for example those disclosed in United States Letters Patent No. 1,674,085, granted June 19, 1928, on application of Milton H. Ballard et al., No. 1,861,832 granted June 7, 1932, and No. 1,896,153 granted on February 7, 1933, on applications of W. C. Baxter, and No. 2,036,086, granted March 31, 1936, on application of F. J. Better, have work supports by operation of which shoe parts are forced against molds or wipers with considerable pressure. In each of these machines the work support pressure is produced by the straightening of a toggle by the action of a cam or crank on a shaft, the shaft being connected through a half-revolution clutch to a gear driven continuously through reducing gearing by an electric motor. When the current to the motor is cut off, the motor and gearing have considerable momentum and continue to run for some time after the current is cut off. The operator may desire to change the molds or wipers with which the machine is equipped or to make adjustment without waiting for the moving parts to come to rest, since to do so would occasion loss of time, but if while so engaged the operator or someone else should accidentally trip the clutch there would be grave danger of the operator being injured since the machine would be operated through at least a portion of its cycle by the momentum of the moving parts. It is also desirable to prevent accidental or unauthorized tripping of the clutch when the machine is not in use and even after the moving parts have come to rest, since such tripping would cause the operating instrumentalities to be presented in a different position from that in which they were and require them to be repositioned before use.

Objects of this invention are to obviate the inconvenience and danger above indicated.

As herein illustrated, the invention which usually will be embodied in a motor-driven machine having a treadle-operated clutch and a switch for controlling the motor, is characterized by means acting simultaneously to cause the motor circuit to be broken and the treadle to be rendered inoperative to set the clutch.

Machines of the type referred to are usually duplex and hence, as illustrated, the arrangement is such that both treadle rods are moved into and out of operative position simultaneously.

Figure 2:
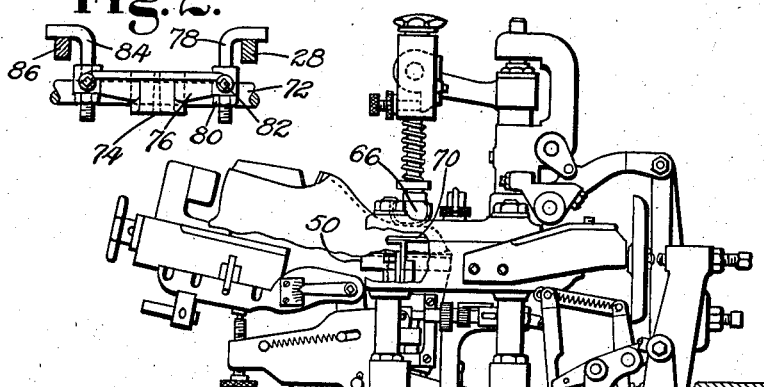
Fig. 2 is a plan view of parts shown in Fig. 1.

The illustrated machine in which the novel mechanism for shutting off the current to the motor and rendering the clutch-controlling treadle inoperative is embodied, is similar to that disclosed in the patent to Better above mentioned to which reference may be had for a description of parts of the machine herein shown but not described. It is to be understood, however, that the invention is equally applicable to various machines of the class referred to.

The frame 10 carries a main shaft 12 on which is mounted a clutch disk 14 having a cam track 16 in one side thereof. A stop projection 20 of the clutch 14 is arranged to engage a stop arm 22 which is pivotally mounted on a shaft 24 supported on the frame of the machine and has a forwardly projecting arm which carries a pin 26. The pin 26 is slabbed off at its front side and cooperates with a vertical treadle rod or bar 28 having an elongated notch 30 which engages the tripping pin. The bar 28 is connected to a treadle 32 and when the treadle is depressed the upper end of the notch 30 will engage the pin 26 and, by lifting the stop arm 22 from engagement with the projection 20, will permit the clutch to engage and the machine to start. The bar 28 is urged toward the pin 26 by a tension spring 33 connected at one end to the bar and at the other to the arm 22. After the machine starts, the bar 28 is pushed forwardly by a projection 23 carried by the clutch disk 14 to free the notch from the pin 26, thus allowing the stop arm 22 to drop back in position and, after a half revolution of the clutch 14, to engage a projection 34 opposite to the projection 20, thereby stopping the machine with the work under pressure. The clutch operates to connect the clutch disk 14 to a gear 36 and to disconnect it therefrom, the gear 36 being continuously driven through reducing gearing by a motor 38. The clutch mechanism employed may be similar to that disclosed in the Ballard et al. patent referred to above. A pinion 40 on the motor shaft engages a large gear 42 mounted on a countershaft 44 which carries a pinion 46 meshing with the gear 36.

The machine is organized for applying pressure to shoe parts and, as illustrated comprises a work support 50 to receive the forepart of a shoe, for example a stitchdown shoe, the work support being mounted on the upper end of a shaft 52 guided in the frame 10 for longitudinal movement. To the lower end of the shaft 52 is connected in the manner described in the patents referred to the upper link 54 of a toggle, the lower link 56 being connected to an adjustable abutment 58 more fully disclosed in Patent No. 1,861,832 previously referred to. The joint 60 of the toggle is pivoted to a cam bar 62 which is forked at its rear end to embrace a collar on the main shaft 12 and is provided with a cam roll 64 running in the cam track 16 formed in the disk 14.

The machine is provided with a toe pad 66 operated in the manner described in the patent to Better above mentioned and with end-embracing wipers 70 which support the projecting margin of the sole against the pressure of the work support 50.

When the treadle 32 is depressed the bar 28 pulls downwardly on the pin 26, causing the stop arm 22 to be lifted above the projection 20, whereupon the clutch acts to connect the disk 14 to the continuously rotating gear 36. The cam track 16 then acts on the roll 64 to push the bar 62 forward in a direction to straighten the toggle 54, 56 to raise the work support 50 and cause the projecting margin of the sole of a shoe and its outturned upper to be pressed against the wipers 70. During the rotation of the clutch disk 14 a projection thereon engages the bar 28 and pushes it forwardly against the spring 33, releasing the clutch 30 from the pin 26 and allowing the stop arm 22 to fall back into position to engage the projection 34 and causing the clutch to be disengaged from the gear 36 after a half revolution of the disk 14.

Obviously, if the bar 28 is swung forwardly far enough to prevent the notch 30 from engaging the pin 26, it will be impossible to trip the clutch by depressing the treadle 32. By this invention means is provided for so swinging the bar 28 and for locking it in its inoperative position and means for simultaneously releasing and locking in released position an arm which presses upon a push button switch which controls the supply of current to the motor, thus stopping the motor and preventing the switch from being operated until the arm is reversely moved and the bar 28 released to permit its return to operating position under the influence of the spring 33.

For this purpose a rockshaft 72 extending transversely of the machine is journaled at its ends in the machine frame. On the shaft 72 is an upright arm 74 having at its upper end a cross-piece 76 through which is threaded a rod 78 the rear end of which is bent at right angles to extend across the rear face of the bar 28. By turning the rod 78 in the cross-bar 76 the relation of the bent end to the bar 28 may be adjusted, the adjustment being maintained by a set nut 80 and a set screw 82. Since machines of this type are duplex, one side of the machine being designed for operation on right shoes and the other side for left shoes, there are two bars operated by separate treadles. Hence the cross-bar 76 is provided at its opposite end with another threaded rod 84 bent at right angles to engage another treadle bar 86 similar to the bar 28. Extending forwardly from the rock-shaft 72 is an arm 88 to which is pivoted at 89 a rod 90 the upper end of which is pivoted at 92 to the lower end of a lever 94 pivoted at 96 to a bracket 98 secured to the machine frame. The upper end of the lever 94 is formed as an operating handle 100. In the position shown it will be seen that the lower arm 97 of the lever 94 forms one link of a toggle the other link of which is formed by the rod 90, and that when this toggle is in straightened position, as illustrated, the pivots 89, 92 and 96 are in line. With the parts in this position, the rods 78, 84 are so adjusted that their oppositely bent ends will engage the rear faces of the treadle bars 28, 86 and will hold them both swung forwardly against their springs 33 sufficiently far so that if the treadle is depressed the notch 30 will not engage the pin 26. If, now, the handle 100 is swung forwardly, the toggle 90, 97 will be broken and the arm 88 swung upwardly to turn the rock-shaft 72 clockwise sufficiently to release the rods 78, 84 from contact with the bars 28, 86 and allow them to reengage the pins 26.

Figure 3:
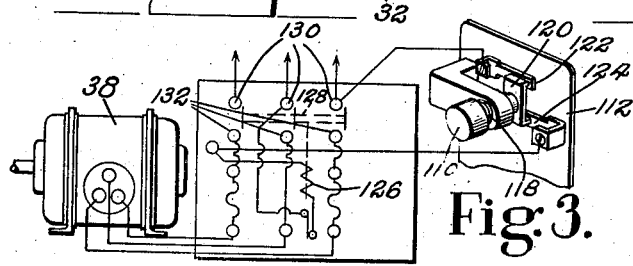
Fig. 3 is a wiring diagram of the motor control.

At the same time that the treadles are rendered operative to trip the clutches the motor should be started, and for this purpose the bracket 98 has a forward projection 102 to which is pivoted at 104 an arm 106 having at its lower end a spring-pressed plunger 108 located opposite a button 110 of a push button switch 112 which controls the supply of current to the motor 38. Between its ends the arm 106 is connected by a link 114 to the lower arm 97 of the hand lever 94, its point of attachment 116 being slightly below and somewhat to the rear of the pivot 96 of the lever so that the link 114 forms one link of an inverted toggle the other link of which is the portion of the lever arm 97 between its pivot 96 and the pivot 116 of the link 114. When the handle 100 is thrown forwardly to render the treadles operative to trip the clutches as described, the inverted toggle is straightened, thereby swinging the arm 106 to force the spring plunger 108 against the push button 110 and close the motor-starting circuit. As shown in the diagram of Fig. 3, pressure on the button 110 against a spring 118 brings a conductor 120 into contact with terminals 122, 124 establishing a low voltage circuit through a solenoid 126 energizing of which operates a switch 128 to connect the terminals 130 with the terminals 132, thus supplying current to the motor. The switch 128 is of course spring biased to open the motor circuits when the solenoid 126 is deenergized by opening the switch 112, that is, by relieving pressure on the push button.

Means is provided for holding the handle 100 in either of its two positions which, as illustrated, comprises a toggle spring 134. As illustrated, the spring 134 is a compression spring mounted on a rod 136 the upper portion of which is bent at right angles and passed through the lever arm 94 to form a pivot for the rod, the lower end of the rod passing freely through a pin 138 rotatably mounted in the bracket 98. It will be seen that the spring 134 tends, when in the position shown, to hold the lever 94 in its rearward position and that when the handle 100 is swung forwardly beyond the pin 138 the spring will tend yieldingly to hold it in its forward position.

Figure 1:
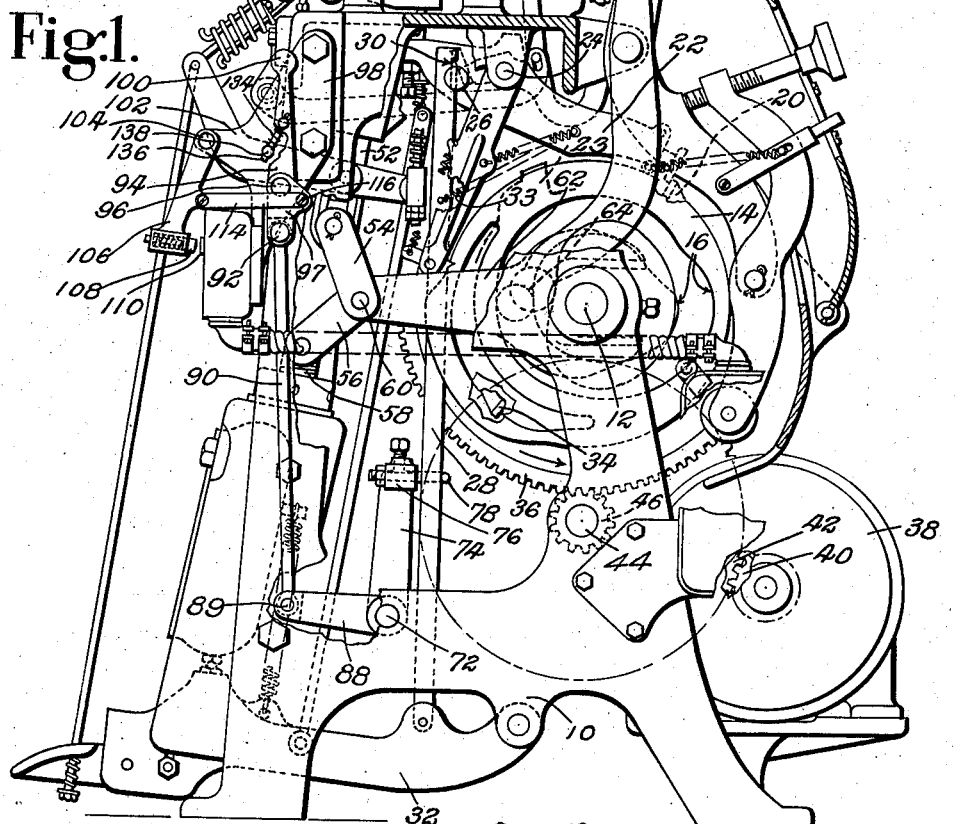
Fig. 1 is a side elevation, partly in section, of a machine embodying the present invention.

When the operator wishes to start the machine, he draws the handle 100 toward him from the positions shown in Fig. 1, causing the toggle formed by the lever arm 97 and the rod 90 to be broken and allowing the spring 33 to draw the bar 28 toward the pin 26 on the clutch trip lever 22. At the same time the inverted toggle formed by the link 114 and the portion of the lever arm 97 between the pivot 96 and the pivot 116 is straightened to draw the arm 106 toward the switch 112 and press the spring plunger 108 against the push button 110, thus closing the circuit through the solenoid 126 the energization of which operates the switch 128 to close the motor circuit and start the motor. Depression of the treadle will now trip the clutch, causing the disk 14 to be connected to the continuously rotating gear 36. After one-half revolution of the disk 14, during which the bar 62 is operated by its cam to straighten the toggle 54, 56 and apply pressure to the shoe, the stop projection 34 engages the arm 22 and releases the clutch. By operating the treadle again the pressure is released. When the operator wishes to stop the machine, for example to make adjustments or to change the operating instrumentalities, he moves the handle 100 rearwardly, thus straightening the toggle 97, 90 and operating the rockshaft 72 in a counterclockwise direction to bring the rods 78, 84 against the rear faces of the treadle rods 28, 86 and swing them forwardly sufficiently to prevent the notches 30 in their ends from engaging the pins 26. At the same time the inverted toggle 114 is broken and the arm 106 swung away from the push button 110, thus breaking the current of the solenoid and causing the motor switch to be opened, while the motor 38, the gear 36 and the reducing gears 42, 46 between them continue to run for some time under their momentum. The operator, however, can safely proceed to make any changes in the machine before introducing another shoe without waiting for the parts in motion to stop because, even if the treadle is depressed accidentally or otherwise, the clutch cannot be tripped and hence operation of the machine by the momentum of the moving parts is impossible until the handle 100 is drawn forward again.

Having thus described the invention, what I claim as new and desire to secure by Letters Patent of the United States is:

1. In a motor-driven machine, reducing gears, a countershaft, a clutch on the countershaft, a clutch-tripping lever pivoted between its ends, a stop lug engaging one end of the lever, a treadle rod having a notch engaging the other end of the lever, a treadle connected to the rod, a switch for controlling the motor, and means for opening the switch and swinging the treadle rod to remove its notch from engagement with the lever.

2. In a machine for applying pressure to shoe parts, a motor, a countershaft driven by the motor, a cam on the countershaft, a clutch between the countershaft and the cam, pressure-applying means operated by the cam, a clutch-tripping rod, a treadle connected thereto, a switch for controlling the motor, and means for opening the switch to stop the motor and for simultaneously rendering the treadle inoperative to trip the clutch.

3. In a machine for applying pressure to shoe parts, a motor, a countershaft driven by the motor, a cam on the countershaft, a clutch between the countershaft and the cam, pressure-applying means operated by the cam, a clutch-tripping lever, a treadle rod engaging the lever, a treadle connected to the treadle rod depression of which trips the clutch, a switch for controlling the motor, and means for opening the switch to stop the motor and for simultaneously moving the treadle rod out of engagement with the clutch-tripping lever to render the treadle inoperative to trip the clutch.

4. In a machine for applying pressure to shoe parts, a countershaft, a motor, a switch for controlling the motor reducing gearing between the motor and the countershaft, a shoe support, means engaging the shoe to oppose movement of the shoe support, a toggle connected to the shoe support, means on the countershaft for operating the toggle, a clutch between the countershaft and the toggle-operating means, a clutch trip lever, a treadle rod engaging the lever, a treadle connected to the rod so that depression of the treadle will trip the clutch, a hand lever yieldingly movable to two positions, and means operated by movement of the lever to one position to open the motor switch and disengage the treadle rod from the clutch-tripping lever and when moved into the other position to close the switch and cause movement of the rod into engagement with the clutch-tripping lever.

5. In a machine for applying pressure to shoe parts, a countershaft, a motor, a motor-controlling switch, reducing gearing between the motor and the countershaft, a shoe support, means engaging the shoe to oppose movement of the shoe support, a toggle connected to the shoe support, means on the countershaft for operating the toggle to move the work support toward the shoe-engaging means, a clutch between the countershaft and the toggle-operating means, a treadle rod connected to the clutch, a treadle connected to the rod so that depression of the treadle will trip the clutch, a hand lever yieldingly movable to two positions, and means operated by movement of the lever to one position to open the motor switch and render the treadle rod inoperative to trip the clutch and when moved in the other position to close the switch and render the treadle rod operative to trip the clutch.

6. A machine according to claim 5 in which movement of the hand lever to one position opens the motor switch and operates a toggle to lock the treadle rod out of engagement with the clutch trip lever.

7. A machine according to claim 5 in which movement of the hand lever in one direction operates a toggle to close the switch and hold it in closed position until the lever is reversely moved.

FRANK KENNISON.